UNITED STATES PATENT OFFICE 2,550,042

PREPARATION OF ALKYL ALPHA-OXO-GAMMA - PHENYL - GAMMA-ALKOXY-BETA-BUTENOATES

Willard J. Croxall, Bryn Athyn, Pa., and Henry J. Schneider, Badger, Wis., assignors to Rohm & Haas Company, Philadelphia, Pa., a corporation of Delaware No Drawing. Application March 31, 1949, Serial No. 84,758

7 Claims. (Cl. 260—473)

This invention deals with the reaction of phenylacetylene and alkyl oxalates in the presence of a strongly basic quaternary ammonium alkoxide and also deals with products obtained thereby.

According to this invention phenylacetylene is reacted with a lower dialkyl oxalate, particularly dimethyl oxalate or diethyl oxalate, in the temperature range of 0° to 30° C. under the influence of a strongly basic quaternary ammonium alkoxide in an amount at least approximately equal to the moles of oxalate.

As quaternary ammonium alkoxides or alcoholates there may be used such compounds as benzyl trimethyl ammonium methoxide or ethoxide, dibenzyl dimethyl ammonium methoxide, tetramethyl ammonium tert.-butoxide, tetramethyl ammonium methoxide, dimethyl di(chlorobenzyl) ammonium methoxide, trimethyl methylbenzyl ammonium methoxide, ethoxide, or tert.-butoxide, trimethyl butylbenzyl ammonium methoxide, trimethyl isopropylbenzyl ammonium methoxide, trimethyl methoxybenzyl ammonium methoxide, dimethyl di(chlorobenzyl) ammonium propoxide, etc. The quaternary ammonium alkoxides are best prepared in the form of their monoalcoholates; that is, with one mole of an alcohol per mol of quaternary ammonium alkoxide.

The use of dimethyl oxalate and diethyl oxalate is preferred since the reaction products therefrom are distillable. Higher dialkyl oxalates can be reacted but given products some of which boil at progressively higher temperatures even under much reduced pressures and tend to decompose thermally as the size of the alkyl group increases. The reaction which occurs may be represented

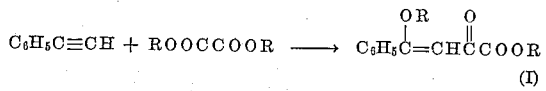
(I)

where R is a lower alkyl group. When R is methyl, the product is

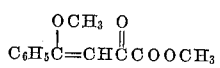

or methyl alpha-oxo-gamma-phenyl-gamma-methoxy-beta-butenoate, a new compound.

The butenoate reacts with an equivalent of alcohol in the presence of a quaternary ammonium alkoxide to form a corresponding alkyl alpha - oxo - gamma - phenyl - gamma,gamma - dialkoxybutyrate,

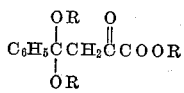
(II)

The compounds can be decarbonylated to give alkyl beta-phenyl-beta,beta-dialkoxypropionates

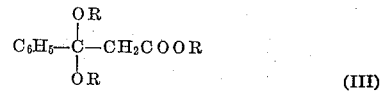
(III)

which lose alcohol to form

(IV)

The same compound is available by decarbonylation of I.

When Compound I is hydrolyzed with acid, it yields alkyl alpha,gamma-dioxo-gamma-phenylbutyrate,

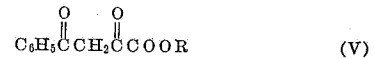
(V)

or the corresponding acid

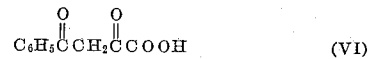
(VI)

The new esters, alkyl alpha-oxo-gamma-phenyl-gamma-alkoxy-beta-butenoates, therefore, are interesting and valuable chemical intermediates.

From the alkyl alpha,gamma-dioxo-gamma-phenylbutyrate there is obtained on decarbonylation alkyl benzoylacetate,

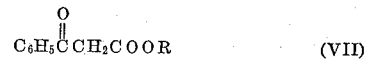
(VII)

This product may also result from the hydrolysis of Compound III or IV.

When the molar ratios of phenylacetylene, dialkyl oxalate, and quaternary ammonium alcoholate are about 1 to 1 to 1, an alkyl alpha-oxo-gamma-phenyl-gamma-alkoxy-beta-butenoate is the primary product, with derivatives being formed when conditions of reaction and of recovery are conducive to the indicated changes. When, however, a definite excess of phenylacetylene is taken, there is formed not only the primary reaction product accompanied by derivatives shown above but also a red crystalline compound, which apparently utilizes a larger ratio of phenylacetylene to oxalate.

As dialkyl oxalates there may be used the dimethyl, diethyl, dipropyl, diisopropyl, dibutyl, diisobutyl, or di-sec.-butyl esters.

The procedure described is specifically illustrated by the following examples.

*Example 1*

In a three-liter, three-necked flask equipped with a mechanical stirrer there was placed a solution of benzyl trimethyl ammonium methoxide in methanol. The excess methanol was taken off under reduced pressure and 240 grams of the monoalcoholate formed. The flask was cooled in an ice-bath to 5° C., and a solution of 118 grams of dimethyl oxalate in 1500 ml. of dry ethyl ether was rapidly added. Phenylacetylene in an amount of 153 grams then was run into the flask while the mixture was stirred. The reaction mixture was then allowed to reach room temperature (25°–30° C.) and stirred for sixteen hours. It was then neutralized with 103 grams of 36% hydrochloric acid. An aqueous layer formed which contained some solid matter which was filtered off. This layer was drawn off and diluted with four volumes of water, whereupon additional solid matter separated. This was collected on a filter, then suspended in dilute sodium bicarbonate solution, and extracted with ether. The clear aqueous layer was acidified with hydrochloric acid. Yellowish-white crystals formed. These were separated and dried, in an amount of 14 grams. This product melted at 142°–145° C. and corresponded in composition to alpha,gamma-dioxo-gamma-phenylbutyric acid. The product was twice recrystallized from benzene and dried at 100° C. in vacuo. It then melted at 155.5°–156° C. and had a neutral equivalent of 194 compared to the calculated value of 192.

The ether extract of the separated solid was added to the main ether layer. This ether solution was then twice washed with 5% sodium bicarbonate solution. Acidification of the washings gave some additional alpha,gamma-dioxo-gamma-phenylbutyric acid which on recrystallization from benzene melted at 155°–156° C.

The ether layer was then subjected to evaporation under reduced pressure and carried to a temperature of 50° C. at 1 mm. to 0.3 mm. A dark red solid was deposited. The residue was taken up in 200 ml. of petroleum ether, warmed to 60° C., and filtered. The crystals were washed with 20 ml. of petroleum ether. The filtrate was heated to drive off the petroleum ether and a distillate obtained at 45°–140° C./0.3 mm. This material was carefully fractionated at low pressure. At 102°–109° C./1 mm. a fraction was obtained which was methyl beta-phenyl-beta-methoxy-alpha-propenoate mixed with methyl beta-phenyl-beta,beta-dimethoxy-propionate. At 109°–112° C./1 mm. the fraction was methyl benzoylacetate with some methyl beta-phenyl-beta-methoxy-alpha-propenoate. This fraction had a saponification equivalent of 168 compared to the calculated value of 178, indicating a 95% purity for this fraction. A fraction was taken off between 112° and 143° C./1 mm. It slowly crystallized. On recrystallization from methanol the product melted at 59.5°–61° C. It corresponded in composition to methyl alpha,gamma-dioxo-gamma-phenylbutyrate. When some of this product was treated with an aqueous solution of copper acetate, an olive-colored oil formed which on separation solidified. This was recrystallized from methanol and then melted at 240° C.

The main fraction was obtained at 143° C./1 mm. It had a carbon content of 65.56%, a hydrogen content of 5.47%, a refractive index of 1.5696, a molecular refraction of 57.80, and a molecular weight by an ebullimetric method of 221. It thus corresponded in composition to methyl alpha-oxo - gamma - phenyl - gamma - methoxy - beta-butenoate, for which the corresponding theoretical values are: Carbon, 65.45%; hydrogen, 5.45%; molecular refraction, 57.05; and molecular weight, 220.

When the above butenoate was shaken with concentrated hydrochloric acid, there was obtained methyl alpha,gamma-dioxo-gamma-phenylbutyrate which melted at 59.5°–61° C.

*Example 2*

A reaction vessel equipped with stirrer and condenser was charged with 656 grams of a 27.8% solution of trimethyl benzyl ammonium methoxide in methanol. It was heated at 30°–35° C. under reduced pressure and free methanol taken off until there remained a monomethanolated trimethyl benzyl methoxide as a viscous syrup, weighing 270 grams. There was added thereto a solution of 150 grams of freshly redistilled dimethyl oxalate in 1500 ml. of carefully dried ethyl ether. This mixture was stirred and cooled in an ice bath. There was then added during about 15 minutes 130 grams of phenylacetylene and stirring was continued for 30 minutes while the reaction vessel remained in the ice bath. The bath was then removed and the mixture warmed to about 25° C. It was then stirred for 24 hours. It was then black in color but homogeneous.

It was neutralized with 130 grams of 36% hydrochloric acid. The color disappeared and two layers formed. The aqueous layer was drawn off. The ether layer was warmed and the ether stripped off. The residue was then distilled. About 55 grams of methanol was obtained and the distillate was taken between 70° and 155° C./1 mm. This was fractionated into a small forerun between 45° and 123° C./0.3 mm., a small fraction at 130° C./0.3 mm., and a main fraction at 130°–140° C./0.3 mm. This last fraction had a refractive index of 1.5692 and was methyl alpha-oxo - gamma - phenyl - gamma - methoxy - beta-butenoate.

Repetition of this procedure with diethyl oxalate yields a product boiling at 155°–165° C./1 mm.-0.5 mm. which corresponds to ethyl alpha-oxo - gamma - phenyl - gamma - ethoxy - beta-butenoate. Similarly, the reaction can be carried out with dipropyl or diisopropyl oxalate or dibutyl or diisobutyl oxalate. The primary reaction product is of the same general formula as in the case of the ethyl or methyl esters.

We claim:

1. A process which comprises reacting together in the presence of a strongly basic quaternary ammonium alcoholate, phenylacetylene and an ester of oxalic acid and a saturated, monohydric, aliphatic alcohol, ROH, wherein R is a non-tertiary alkyl group of not over four carbon atoms, in the quaternary ammonium alcoholate the alcoholate group being that of a saturated monohydric aliphatic alcohol of not over four carbon atoms with two to four of the N-substituents being methyl and any quaternary substituent other than methyl being benzyl.

2. A process which comprises reacting together between 0° and 30° C. a molar proportion of phenylacetylene and a molar proportion of an ester of oxalic acid and a saturated, monohydric, aliphatic alcohol, ROH, wherein R is a non-tertiary alkyl group of not over four carbon atoms, in the presence of about a molar proportion of a strongly basic quaternary ammonium alcoholate as catalyst, in the quaternary ammonium alcoholate the alcoholate group being that of a saturated monohydric aliphatic alcohol of not over four carbon atoms with two to four of the N-substituents being methyl and any quaternary substituent other than methyl being benzyl.

3. A process which comprises reacting together between 0° and 30° C. a molar proportion of phenylacetylene and a molar proportion of dimethyl oxalate in the presence of about a molar proportion of a strongly basic quaternary ammonium alcoholate as catalyst, in the quaternary ammonium alcoholate the alcoholate group being that of a saturated monohydric aliphatic alcohol of not over four carbon atoms with two to four of the N-substituents being methyl and any quaternary substituent other than methyl being benzyl.

4. The process of claim 3 in which the quaternary ammonium alcoholate is benzyl trimethyl ammonium methoxide.

5. As a new chemical substance, a compound of the formula $$C_6H_5\overset{OR}{\underset{|}{C}}=CH\overset{O}{\underset{\|}{C}}COOR$$

wherein R is a non-tertiary alkyl group of not over four carbon atoms.

6. As a new chemical substance, a compound of the formula $$C_6H_5\overset{OCH_3}{\underset{|}{C}}=CH\overset{O}{\underset{\|}{C}}COOCH_3$$

7. As a new chemical substance, a compound of the formula $$C_6H_5\overset{OC_2H_5}{\underset{|}{C}}=CH\overset{O}{\underset{\|}{C}}COOC_2H_5$$

WILLARD J. CROXALL.
HENRY J. SCHNEIDER.

REFERENCES CITED

The following references are of record in the file of this patent:

UNITED STATES PATENTS

| Number | Name | Date |
|--------|------|------|
| 2,066,075 | Reppe | Dec. 29, 1936 |
| 2,228,791 | Soday | Jan. 14, 1941 |
| 2,351,664 | Cockerille | June 20, 1944 |